US011142664B2

(12) United States Patent
Murai (10) Patent No.: US 11,142,664 B2
(45) Date of Patent: Oct. 12, 2021

(54) INK JET TEXTILE PRINTING COMPOSITION SET AND INK JET TEXTILE PRINTING METHOD

(71) Applicant: Seiko Epson Corporation, Tokyo (JP)

(72) Inventor: Masayuki Murai, Matsumoto (JP)

(73) Assignee: Seiko Epson Corporation

(*) Notice: Subject to any disclaimer, the term of this patent is extended or adjusted under 35 U.S.C. 154(b) by 305 days.

(21) Appl. No.: 16/362,752

(22) Filed: Mar. 25, 2019

(65) Prior Publication Data

US 2019/0292393 A1   Sep. 26, 2019

(30) Foreign Application Priority Data

Mar. 26, 2018  (JP) .............................. JP2018-057900

(51) Int. Cl.
| | |
|---|---|
| *C09D 11/40* | (2014.01) |
| *C09D 11/033* | (2014.01) |
| *C09D 11/037* | (2014.01) |
| *C09D 11/328* | (2014.01) |
| *C09D 11/38* | (2014.01) |
| *C09D 11/50* | (2014.01) |
| *B41M 5/00* | (2006.01) |
| *B41M 7/00* | (2006.01) |
| *C09D 11/54* | (2014.01) |

(Continued)

(52) U.S. Cl.
CPC ........... *C09D 11/40* (2013.01); *B41M 5/0023* (2013.01); *B41M 5/0047* (2013.01); *B41M 7/0018* (2013.01); *C09D 11/033* (2013.01); *C09D 11/037* (2013.01); *C09D 11/328* (2013.01); *C09D 11/38* (2013.01); *C09D 11/50* (2013.01); *C09D 11/54* (2013.01); *D06P 1/39* (2013.01); *D06P 1/40* (2013.01); *D06P 1/642* (2013.01); *D06P 1/6426* (2013.01); *D06P 5/06* (2013.01); *D06P 5/30* (2013.01)

(58) Field of Classification Search
USPC ............................................. 106/31.01, 31.13
See application file for complete search history.

(56) References Cited

U.S. PATENT DOCUMENTS

| | | | | |
|---|---|---|---|---|
| 5,224,987 A | * | 7/1993 | Matrick | ................ C09D 11/38 |
| | | | | 106/31.43 |
| 6,080,229 A | * | 6/2000 | Watanabe | ................. B41J 2/15 |
| | | | | 106/31.43 |

(Continued)

FOREIGN PATENT DOCUMENTS

| | | |
|---|---|---|
| EP | 2537679 A1 | 12/2012 |
| EP | 3053972 A1 | 8/2016 |

(Continued)

OTHER PUBLICATIONS

Dayglo Color Corporation Acid Black 172, www.dayglo.in/acid_dyes.html, no date available; 4 pages.*

(Continued)

*Primary Examiner* — James E McDonough
(74) *Attorney, Agent, or Firm* — Harness, Dickey & Pierce, P.L.C.

(57) ABSTRACT

An ink jet textile printing composition set of the invention includes an ink jet textile printing ink composition and a penetrant. The ink jet textile printing ink composition contains a fluorescent dye and water, and the penetrant contains a compound having a lactam structure and water.

13 Claims, 1 Drawing Sheet

(51) Int. Cl.
  *D06P 1/39*   (2006.01)
  *D06P 1/40*   (2006.01)
  *D06P 5/30*   (2006.01)
  *D06P 1/642*  (2006.01)
  *D06P 5/06*   (2006.01)

(56) References Cited

U.S. PATENT DOCUMENTS

| | | | |
|---|---|---|---|
| 2004/0233263 A1 | 11/2004 | Goto et al. | |
| 2010/0056704 A1 | 3/2010 | Iwamura et al. | |
| 2011/0316927 A1* | 12/2011 | Yamashita | D06P 1/5242 347/20 |
| 2012/0327156 A1* | 12/2012 | Aruga | B41J 2/1707 347/20 |
| 2016/0214401 A1 | 7/2016 | Komatsu | |
| 2016/0230334 A1* | 8/2016 | Oki | D06P 1/65131 |
| 2018/0001643 A1 | 1/2018 | Hama et al. | |
| 2019/0100669 A1* | 4/2019 | Murai | B41J 3/4078 |
| 2020/0071553 A1* | 3/2020 | Sakuma | C09D 11/328 |

FOREIGN PATENT DOCUMENTS

| | | |
|---|---|---|
| EP | 3461867 A1 | 4/2019 |
| JP | 2016-044259 A | 4/2016 |
| JP | 2017-115094 A | 6/2017 |
| WO | WO-2008-019075 A1 | 2/2008 |

OTHER PUBLICATIONS

Acid Black 172 Structure from PubChem, https://pubchem.ncbi.nlm.nih.gov/compound/Acid-Black-172, no date available; 12 pages.*
Extended European Search Report for Patent Application No. EP 19165217.1, dated Jul. 16, 2019 (9 pages).

* cited by examiner

INK JET TEXTILE PRINTING COMPOSITION SET AND INK JET TEXTILE PRINTING METHOD

BACKGROUND

1. Technical Field

The present invention relates to an ink jet textile printing composition set and an ink jet textile printing method.

2. Related Art

A textile printing method of recording an image to a fabric, such as woven fabric, knitted fabric, and nonwoven fabric, is known. In recent years, the utilization of an ink jet recording system has been examined from the viewpoint that an ink composition (hereinafter also referred to as "ink") used for textile printing can be efficiently used, for example. According to an ink jet textile printing method using the ink jet recording system, an ink formed into a liquid droplet shape is discharged from a nozzle of an ink jet head, and then attached to a fabric, whereby an image of an ink coating film is formed on the fabric.

In the ink used for such an ink jet textile printing method, an acidic dye or a reactive dye which is an fluorescent dye may be used to provide an ink jet textile printing ink set having good color reproducibility (for example, JP-A-2016-44259).

However, when fluorescent dyes are close to each other due to, for example, high dye concentration, a phenomenon that the fluorescence generated from dye molecules is absorbed by the other dye molecules, so that the fluorescence intensity decreases, which is referred to as concentration quenching, may arise, and therefore the fluorescence intensity is not sufficient.

SUMMARY

Application Example 1

An ink jet textile printing composition set according to an aspect of the invention includes an ink jet textile printing ink composition and a penetrant. The ink jet textile printing ink composition contains a fluorescent dye and water, and the penetrant contains a compound having a lactam structure and water.

Application Example 2

In the ink jet textile printing composition set according to Application Example 1, the content of the compound having the lactam structure may be 5.0% by mass or more based on the total mass of the penetrant.

Application Example 3

In the ink jet textile printing composition set according to Application Example 1 or 2, the compound having the lactam structure may contain 2-pyrrolidone or N-methyl-2-pyrrolidone.

Application Example 4

In the ink jet textile printing composition set according to any one of Application Examples 1 to 3, the fluorescent dye may be an acidic dye.

Application Example 5

In the ink jet textile printing composition set according to any one of Application Examples 1 to 4, the fluorescent dye may contain one or more selected from C.I. Acid Yellow 184, C.I. Acid Yellow 250, C.I. Acid Yellow 73, C.I. Acid Red 52, C.I. Acid Red 74, and C.I. Acid Red 289.

Application Example 6

In the ink jet textile printing composition set according to any one of Application Examples 1 to 5, the content of the fluorescent dye may be 0.8% by mass or more and 5.0% by mass or less based on the total mass of the ink jet textile printing ink composition.

Application Example 7

In the ink jet textile printing composition set according to any one of Application Examples 1 to 6, the ink jet textile printing ink composition may contain one or more selected from an Na ion, a K ion, and an Li ion, and the total content of the Na ion, the K ion, and the Li ion may be 100 ppm or more and 8000 ppm or less.

Application Example 8

An ink jet textile printing method according to an aspect of the invention is a recording method that performs printing using the ink jet textile printing ink composition and the penetrant according to any one of Application Examples 1 to 7. The method includes attaching the ink jet textile printing ink composition to a fabric, and attaching the penetrant onto a region where the ink jet textile printing ink composition is attached.

Application Example 9

In the ink jet textile printing method according to Application Example 8, the attachment amount of the penetrant to the attachment amount of the ink jet textile printing ink composition may be 0.3 or more and 2.0 or less in a mass ratio.

BRIEF DESCRIPTION OF THE DRAWINGS

The invention will be described with reference to the accompanying drawing, wherein like numbers reference like elements.

DESCRIPTION OF EXEMPLARY EMBODIMENTS

Figure 1:
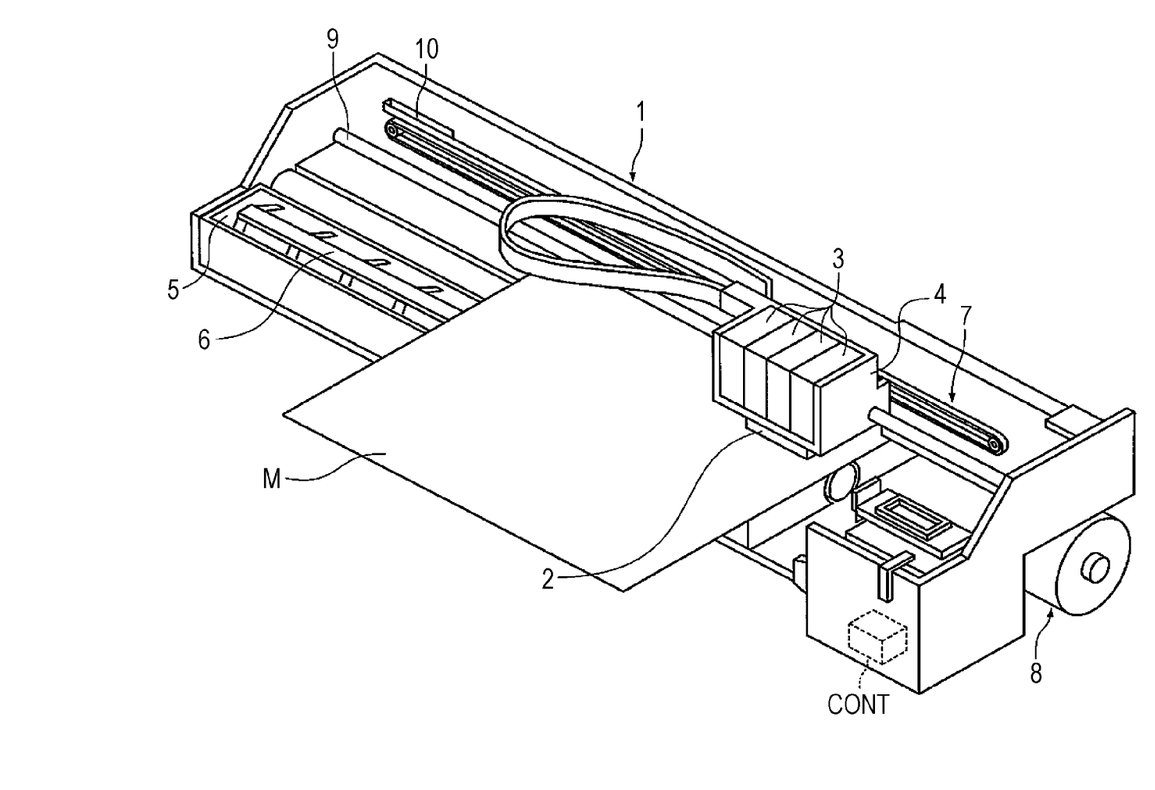
FIGURE is a schematic perspective view of a textile printing apparatus implementing an ink jet textile printing method according to this embodiment.

Hereinafter, some embodiments of the invention are described. Each embodiment described below describes an example of the invention. The invention is not limited to the following embodiments at all and also includes various modifications to be implemented without altering the gist of the invention. All the configurations described below are not necessarily indispensable configurations of the invention.

An ink jet textile printing composition set according to an aspect of this embodiment includes an ink jet textile printing ink composition and a penetrant. The ink jet textile printing ink composition contains a fluorescent dye and water, and the penetrant contains a compound having a lactam structure and water.

An ink jet textile printing method according to an aspect of this embodiment includes a process of discharging a pigment textile printing ink jet ink composition according to this embodiment from an ink jet nozzle, and attaching the pigment textile printing ink jet ink composition to a fabric.

Hereinafter, with respect to the ink jet textile printing composition set and the ink jet textile printing method according to this embodiment, the configuration of a textile printing apparatus capable of implementing the same, an ink jet textile printing ink composition (hereinafter also referred to as "textile printing ink", "ink composition", and "ink"), a penetrant, an ink jet textile printing composition set, a fabric to which the ink jet textile printing method is performed, and the ink jet textile printing method are described in detail in this order.

1. Textile Printing Apparatus

First, an example of a textile printing apparatus to be used in this embodiment is described with reference to the drawing. The textile printing apparatus to be used in this embodiment is not limited to the following aspect.

The textile printing apparatus to be used in this embodiment is described taking an on-carriage type printer in which an ink cartridge is mounted in a carriage as an example. However, the textile printing apparatus is not limited to the on-carriage type printer and may be an off-carriage type printer in which an ink cartridge is not mounted in a carriage and is fixed to the outside.

A printer to be used for the following description is a serial printer in which a print head is mounted in a carriage moving in the predetermined direction and which discharges droplets onto a recording medium by the movement of the head in connection with the movement of the carriage. The textile printing apparatus to be used in the invention is not limited to the serial printer and may be a line printer in which a head is formed to be larger than the width of a recording medium and which discharges droplets onto a recording medium without the movement of a print head.

In a drawing used for the following description, the scale of each member is changed as appropriate so that each member can be recognized.

As the textile printing apparatus, an ink jet printer (hereinafter also referred to as "printer") mounted with an ink jet head illustrated in FIGURE is mentioned, for example. As illustrated in FIGURE, a printer 1 has a carriage 4 which is mounted with an ink jet head 2 and to which an ink cartridge 3 is detachably attached, a platen 5 which is disposed below the ink jet head 2 and to which a fabric M which is a recording medium is transported, a heating mechanism 6 for heating the fabric M, a carriage moving mechanism 7 causing the carriage 4 to move in the medium width direction of the fabric M, and a medium feeding mechanism 8 transporting the fabric M in the medium feeding direction. Moreover, the printer 1 has a control device CONT controlling an operation of the whole printer 1. The medium width direction is a main scanning direction (head scanning direction). The medium feeding direction is a subscanning direction (direction orthogonal to the main scanning direction).

The ink jet head 2 is a unit for attaching an ink to the fabric M and is provided with a plurality of nozzles (not illustrated) discharging the ink on a surface opposite to the fabric M to which the ink is attached. The plurality of nozzles is arranged in an array shape, and thus a nozzle surface is formed on the nozzle plate surface.

Examples of systems of discharging an ink from nozzles include, for example, a system of applying a strong electric field between the nozzles and an accelerating electrode placed in front of the nozzles to continuously discharge an ink in the form of droplets from the nozzles and discharging the ink droplets corresponding to a recording information signal while the ink droplets are flying between deflecting electrodes (electrostatic suction system); a system of applying a pressure to a treatment liquid with a small pump to mechanically vibrate nozzles with a quartz oscillator or the like to thereby forcibly discharge ink droplets; a system of simultaneously applying a pressure and a recording information signal to an ink with a piezoelectric element to discharge and record ink droplets (piezoelectric system); a system of heating and foaming an ink with a microelectrode according to a recording information signal to discharge and record ink droplets (thermal jet system); and the like.

As the ink jet head 2, both a line type ink jet head and a serial type ink jet head are usable and the serial type ink jet head is used in this embodiment.

Herein, the textile printing apparatus provided with the serial type ink jet head performs recording by performing scanning (path) of discharging an ink while moving an ink jet head for recording relatively to a recording medium several times. Specific examples of the serial type ink jet head include one in which an ink jet head is mounted in a carriage moving in the width direction of a recording medium (direction crossing the transporting direction of the recording medium) and which discharges droplets onto the recording medium by the movement of the ink jet head in connection with the movement of the carriage.

On the other hand, the textile printing apparatus provided with the line type ink jet head performs recording by performing scanning (path) of discharging an ink while moving the ink jet head relatively to a recording medium once. Specific examples of the line type ink jet head include one in which the ink jet head is formed to be larger than the width of a recording medium and which discharges droplets onto the recording medium without the movement of the ink jet head.

The ink cartridge 3 supplying an ink to the ink jet head 2 contains four independent cartridges. Each of the four cartridges is filled with a different kind of ink, for example. The ink cartridge 3 is detachably attached to the ink jet head 2. In the example of FIGURE, the number of the cartridges is four but a desired number of cartridges can be mounted without being limited thereto.

The carriage 4 is attached in a state of being supported with a guide rod 9 which is a support member installed in the main scanning direction. The carriage 4 moves in the main scanning direction along the guide rod 9 by the carriage moving mechanism 7. Although the example of FIGURE illustrates one in which the carriage 4 moves in the main scanning direction, the invention is not limited thereto and one moving in the subscanning direction in addition to the movement in the main scanning direction may be acceptable.

The installation position of the heating mechanism 6 is not particularly limited insofar as the heating mechanism 6 is provided at a position where the fabric M can be heated. In the example of FIGURE, the heating mechanism 6 is disposed at a position which is located on the platen 5 and in which the heating mechanism 6 faces the ink jet head 2. Thus, when the heating mechanism 6 is disposed at the position where the heating mechanism 6 faces the ink jet head 2, the attachment position of droplets in the fabric M can be certainly heated, and therefore the droplets attached to the fabric M can be efficiently dried.

For the heating mechanism 6, a print heater mechanism of bringing the fabric M into contact with a heat source for heating, a mechanism emitting infrared rays, microwaves which are electromagnetic waves having a maximum wave length around 2,450 MHz, and the like, a drier mechanism spraying warm air, and the like are usable, for example.

The heating of the fabric M by the heating mechanism 6 is performed before or when the droplets discharged from the nozzles of the ink jet head 2 are attached to the fabric M. The control of the conditions for the heating, e.g., timing of performing the heating, heating temperature, heating time, and the like, is performed by the control device CONT.

The heating of the fabric M by the heating mechanism 6 is performed so that the fabric M holds the temperature range of 35° C. or more and 65° C. or less from the viewpoint of the wettability and spreadability, an improvement of permeability and drying property, discharge stability, and the like of an ink. Herein, the temperature for heating the fabric M means the temperature of the surface of the recording surface of the fabric M in heating.

The printer 1 may further have a second heating mechanism which is not illustrated besides the heating mechanism 6. In that case, the second heating mechanism is disposed on the downstream side in the transporting direction of the fabric M relative to the heating mechanism 6. The second heating mechanism heats the fabric M after the fabric M is heated by the heating mechanism 6, i.e., after the droplets discharged from the nozzles are attached to the fabric M. Thus, the drying property of the droplets of the ink attached to the fabric M is improved. For the second heating mechanism, any one of the mechanisms described for the heating mechanism 6, e.g., drier mechanism, heat press mechanism, and the like, is usable. The heating by the second heating mechanism is preferably performed so that the fabric M holds the temperature range of 100° C. or more and 200° C. or less.

A linear encoder 10 detects the position in the main scanning direction of the carriage 4 by a signal. The detected signal is transmitted to the control device CONT as position information. The control device CONT recognizes the scanning position of the recording head 2 based on the position information from the linear encoder 10 to control a recording operation (discharge operation) and the like by the recording head 2. Moreover, the control device CONT is configured so as to be able to variably control the movement speed of the carriage 4.

2. Ink Jet Textile Printing Ink Composition

The ink jet textile printing ink to be used in this embodiment is used in order to perform printing by being attached to a fabric with a penetrant by an ink jet method and contains a fluorescent dye and water.

Hereinafter, the ink jet textile printing ink to be used in this embodiment is described.

2.1. Fluorescent Dye

The ink jet textile printing ink to be used in this embodiment contains a fluorescent dye as a coloring material. As the fluorescent dye, an acidic dye or a reactive dye is mentioned.

Examples of the acidic dye include, but are not particularly limited to, C.I. Acid Yellow 17, 19, 23, 34, 36, 42, 49, 73, 79, 99, 110, 127, 137, 151, 166, 184, 194, 199, 204, 220, 232, 241, and 250, C.I. Acid Blue 1, 7, 9, 15, 22, 23, 25, 27, 29, 40, 41, 43, 45, 49, 54, 59, 60, 62, 72, 74, 78, 80, 82, 83, 87, 90, 92, 93, 100, 102, 103, 104, 112, 113, 114, 117, 120, 126, 127, 128, 129, 130, 131, 133, 138, 140, 142, 143, 151, 154, 156, 158, 161, 166, 167, 168, 170, 171, 175, 182, 183, 184, 185, 187, 192, 193, 201, 203, 204, 205, 207, 209, 220, 221, 224, 225, 229, 230, 239, 249, 258, 260, 264, 277:1, 278, 279, 280, 284, 290, 296, 298, 300, 317, 324, 333, 335, 338, 342, and 35, C.I. Acid Red 1, 14, 18, 33, 52, 73, 74, 88, 97, 106, 114, 119, 131, 138, 141, 151, 182, 183, 184, 186, 195, 198, 211, 249, 252, 263, 289, 315, 337, 357, 362, 407, 414, and 423, C.I. Acid Black 1, 2, 52, 52:1, 172, 194, 210, and 234, C.I. Acid Orange 7, 8, 10, 18, 33, 51, 56, 67, 74, 86, 94, 95, 142, 154, C.I. Acid Brown 1, 14, 45, 75, 83, 98, 106, 161, 165, 214, 288, 298, 348, 349, 355, 365, 422, 425, and 434, C.I. Acid Green 9, 16, 20, 25, 28, 68, 73, 101, and 104, C.I. Acid Violet 17, 43, 48, 49, 54, 90, and 97, and the like for example.

Examples of the reactive dye include, but are not particularly limited to, C.I. Reactive Yellow 2, 5, 18, 22, 42, 44, 57, 77, 81, 84, 86, 95, 105, 107, 135, 145, 160, and 186, C.I. Reactive Blue 13, 15, 15:1, 19, 21, 49, 50, 59, 72, 77, 176, and 220, C.I. Reactive Red 3, 3:1, 11, 24, 24:1, 31, 35, 52, 76, 84, 111, 120, 141, 152, 180, 195, 198, 218, 226, and 245, C.I. Reactive Black 5, 8, 31, and 39, C.I. Reactive Orange 4, 7, 12, 13, 15, 16, 35, 62, 72, 78, 99, 122, and 181, C.I. Reactive Brown 11 and 18, C.I. Reactive Green 8, 12, and 15, C.I. Reactive Violet 1, 2, 5, 13, and 33, and the like, for example.

The fluorescent dyes mentioned above may be used alone or in combination of two or more kinds thereof.

In this embodiment, the lower limit of the molecular weight of the fluorescent dye used for the ink may be 350 or more, may be 400 or more, and may be 450 or more. In this embodiment, the upper limit of the molecular weight of the fluorescent dye used for the ink may be 700 or less, may be 680 or less, and may be 650 or less.

In this embodiment, the fluorescent dye may be the acidic dye. Among the acidic dyes, C.I. Acid Yellow 184 (AY184, Molecular formula: $C_{20}H_{18}N_3NaO_5S$, Molecular weight: 435.4), C.I. Acid Yellow 250 (AY250, Molecular formula: $C_{20}H_{18}N_3NaO_8S_2$, Molecular weight: 515.5), C.I. Acid Yellow 73 (AY73, Molecular formula: $C_{20}H_{18}N_3NaO_5S$, Molecular weight: 376.27), C.I. Acid Red 52 (AR52, Molecular formula $C_{27}H_{29}N_2NaO_7S_2$, Molecular weight 580.7), C.I. Acid Red 74 (AY74, Molecular formula: $C_{16}H_{11}N_4NaO_5S$, Molecular weight; 394.34), and C.I. Acid Red 289 (AR289, Molecular formula: $C_{35}H_{29}N_2NaO_7S_2$, Molecular weight: 676.734) may be acceptable. Among the above, C.I. Acid Yellow 184, C.I. Acid Yellow 250, C.I. Acid Red 52, and C.I. Acid Red 289 are preferable and C.I. Acid Yellow 184 and C.I. Acid Red 52 are more preferable in the point that good color developability and fluorescence intensity are easily obtained.

The fluorescent dyes are molecules having a rigid structure and emit fluorescence by absorbing the energy of UV and the like, and then releasing the energy as light. When such a fluorescent dye is used, the concentration quenching can be suppressed and a fluorescence intensity difference between the front and rear surfaces can be made small by being used as a set with a penetrant described later.

The lower limit of the content of the fluorescent dye is preferably 0.5% by mass or more, more preferably 0.8% by mass or more, and still more preferably 1.0% by mass or more based on the total mass of the ink composition. The upper limit of the content of the fluorescent dye is preferably 10% by mass or less, more preferably 8.0% by mass or less, and still more preferably 5.0% by mass or less based on the total mass of the ink composition. When the content of the fluorescent dye is within the range mentioned above, the color developability improves and a fluorescence intensity reduction can be suppressed by being used as a set with the penetrant described later. The penetrant promotes the permeation into the rear surface, and therefore the fluorescence intensity in the rear surface can also be increased and the fluorescence intensity difference between the front and rear surfaces can be made small. In particular, due to the fact that the content of the fluorescent dye is equal to or more than the lower limit mentioned above, sufficient color developability can be secured in the front and rear surfaces. Due to the fact that the content of the fluorescent dye is equal to or less than the upper limit, the concentration quenching can be suppressed and sufficient fluorescence intensity can be secured in the front and rear surfaces.

2.2. Organic Solvent

In this embodiment, the ink jet textile printing ink composition may contain an organic solvent. As the organic solvent, volatile water-soluble organic solvents are preferable and glycol ethers or alkyl polyols are preferably used.

Glycol Ether

As the glycol ethers, monoalkyl ethers of glycols selected from ethylene glycol, diethylene glycol, triethylene glycol, polyethylene glycol, propylene glycol, dipropylene glycol, tripropylene glycol, polypropylene glycol, and polyoxyethylene polyoxypropylene glycol are preferable, for example. More preferably, methyl triglycol (triethylene glycol monomethyl ether), butyl triglycol (triethylene glycol monobutyl ether) [278° C.], butyl diglycol (diethylene glycol monobutyl ether), dipropylene glycol monopropyl ether, and the like are mentioned and diethylene glycol monobutyl ether [230° C.] is mentioned as a typical example. The numerical value in brackets indicates the normal boiling point.

Two or more kinds of the glycol ethers may be mixed and used. The lower limit of the content when the glycol ether is used is preferably 1% by mass or more, more preferably 2.5% by mass or more, and still more preferably 4% by mass or more in total based on the total mass of the ink jet textile printing ink composition. The upper limit of the content of the glycol ether is preferably 15% by mass or less, more preferably 12% by mass or less, and still more preferably 10% by mass or less based on the total mass of the ink composition. Due to the fact that the content of the glycol ether is within the range mentioned above, it becomes easy to adjust the viscosity or the surface tension of the ink jet textile printing ink composition in a suitable range. Due to a moisturizing effect of the glycol ether, clogging of an ink jet head is prevented.

Alkyl Polyol

Examples of the alkyl polyols include, for example, 1,2-butanediol [194° C.], 1,2-pentanediol [210° C.], 1,2-hexanediol [224° C.], 1,2-heptanediol [227° C.], 1,3-propanediol (propylene glycol) [188° C.], 1,3-butanediol [230° C.], 1,4-butanediol [230° C.], 1,5-pentanediol [242° C.], 1,6-hexanediol [250° C.], 2-ethyl-2-methyl-1,3-propanediol [226° C.], 2-methyl-2-propyl-1,3-propanediol [230° C.], 2-methyl-1,3-propanediol [214° C.], 2,2-dimethyl-1,3-propanediol [210° C.], 3-methyl-1,3-butanediol [203° C.], 2-ethyl-1,3-hexanediol [244° C.], 3-methyl-1,5-pentanediol [250° C.], 2-methylpentane-2,4-diol [197° C.], ethylene glycol [197° C.], diethylene glycol [245° C.], dipropylene glycol [230° C.], triethylene glycol [276° C.], glycerol [290° C.], and the like. The numerical value in brackets indicates the normal boiling point. The alkyl polyols may be used alone or in combination of two or more kinds thereof.

The lower limit of the content when the alkyl polyol is compounded is preferably 9% by mass or more, more preferably 12% by mass or more, and still more preferably 15% by mass or more in total based on the total mass of the ink jet textile printing ink composition. The upper limit of the content of the alkyl polyol is preferably 32% by mass or less, more preferably 25% by mass or less, and still more preferably 20% by mass or less based on the total mass of the ink jet textile printing ink composition. Due to the fact that the content of the alkyl polyol is within the range mentioned above, it becomes easy to adjust the viscosity or the surface tension of the ink jet textile printing ink composition in a suitable range. Moreover, the clogging of an ink jet head is prevented.

Nitrogen Containing Compound

Examples of nitrogen containing compounds include, for example, nitrogen containing heterocyclic compounds, such as ε-caprolactam [136° C.], N-methyl-2-pyrrolidone [204° C.] N-ethyl-2-pyrrolidone [212° C.], N-vinyl-2-pyrrolidone [193° C.], 2-pyrrolidone [245° C.], and 5-methyl-2-pyrrolidone [248° C.] and the like. The numerical value in brackets indicates the normal boiling point. The nitrogen containing compounds may be used alone or in combination of two or more kinds thereof. In such nitrogen containing compounds, effects that the dyes described above are easily dissolved and the solidification or drying of the ink jet textile printing ink composition is suppressed can be expected.

On the other hand, when a large number of the nitrogen containing compounds are contained, the dye in the ink spreads, so that blurring occurs or the ink excessively permeates into the rear surface of a fabric, and therefore the fluorescence intensity difference between the front and rear surfaces becomes large in some cases. Furthermore, the storageability of the ink decreases in some cases. Therefore, the total when the nitrogen containing compound is used is preferably 10% by mass or less, more preferably 5% by mass or less, still more preferably 3% by mass or less, and particularly preferably 1% by mass or less based on the total mass of the ink jet textile printing ink composition. Due to the fact that the content of the nitrogen containing compound is within the range mentioned above, the storage stability of the ink jet textile printing ink composition can be secured and the blurring or the fluorescence intensity difference between the front and rear surfaces can be suppressed.

Other Organic Solvents

Furthermore, in this embodiment, lactones, such as γ-butyrolactone, betaine compounds, and the like are mentioned as the organic solvent usable for the ink jet textile printing ink composition. When the organic solvents are used, a moisturizing effect of the ink is obtained and also an effect of controlling the wettability or the permeation speed to improve the color developability of an image is obtained.

In this embodiment, the lower limit of the total content of the organic solvents is preferably 20% by mass or more, more preferably 22% by mass or more, and still more preferably 24% by mass or more in total based on the total mass of the ink jet textile printing ink composition. The upper limit of the total content of the organic solvents is preferably 32% by mass or less, more preferably 30% by mass or less, and still more preferably 28% by mass or less based on the total mass of the ink jet textile printing ink composition. Due to the fact that the total content of the organic solvents is within the range mentioned above, it becomes easy to adjust the viscosity or the surface tension of the ink jet textile printing ink composition in a suitable range, the blurring can be suppressed, and the permeation into the rear surface of the ink can be controlled. Moreover, the clogging of an ink jet head is prevented and discharge stability is obtained in ink jet textile printing.

2.3. Water

In this embodiment, the ink jet textile printing ink composition contains water. As the water, those from which ionic impurities are reduced, such as pure water or ultrapure water, e.g., ion exchanged water, ultrafiltration water, reverse osmosis water, and distilled water, are mentioned, for example. When water sterilized by irradiation with ultraviolet rays or the addition of hydrogen peroxide, for example, is used, the generation of bacteria or fungi can be suppressed when the ink jet textile printing ink composition is stored over a long period of time.

The content of the water is preferably 30% by mass or more, more preferably 40% by mass or more, still more preferably 45% by mass or more, and particularly preferably 50% by mass or more based on the total mass of the ink jet textile printing ink composition. In the case of the water in the ink jet textile printing ink composition, water when the water is contained in the raw material and water to be added are included, for example. Due to the fact that the content of the water is 30% by mass or more, the viscosity of the ink jet textile printing ink composition can be set to a low viscosity. The upper limit of the content of the water is preferably 90% by mass or less, more preferably 85% by mass or less, and still more preferably 80% by mass or less based on the total mass of the ink jet textile printing ink composition.

2.4. Other Components

Surfactant

The ink jet textile printing ink composition according to this embodiment may also contain a surfactant. The surfactant can be used as a wetting agent for reducing the surface tension of the ink jet textile printing ink composition to adjust the wettability with a fabric, i.e., permeability into a fabric. As the surfactant, nonionic surfactants, anionic surfactants, cationic surfactants, and amphoteric surfactants are all usable and may be used in combination. Among the surfactants, acetylene glycol-based surfactants, silicone-based surfactants, and fluorine-based surfactants can be preferably used.

Examples of the acetylene glycol-based surfactants include, but are not particularly limited to, Surfynol 104, 104E, 104H, 104A, 104BC, 104DPM, 104PA, 104PG-50, 104S, 420, 440, 465, 485, SE, SE-F, 504 61, DF37, CT111, CT121, CT131, CT136, TG, GA, and DF110D (all Trade Names, manufactured by Nisshin Chemical Co., Ltd.), Olefin B, Y, P, A, STG, SPC, E1004, E1010, PD-001, PD-002W, PD-003, PD-004, PD-005, EXP. 4001, EXP. 4036, EXP. 4051, AF-103, AF-104, AK-02, SK-14, and AE-3 (all Trade Names, manufactured by Nisshin Chemical Co., Ltd.), and Acetylenol E00, E00P, E40, and E100 (all Trade Names, manufactured by Kawaken Fine Chemicals Co., Ltd. make), for example.

As the silicone-based surfactants, polysiloxane-based compounds are preferably mentioned although not particularly limited thereto. Examples of the polysiloxane-based compounds include, but are not particularly limited to, polyether-modified organosiloxane, for example. Examples of commercially-available items of the polyether-modified organosiloxane include, for example, BYK-306, BYK-307, BYK-333, BYK-341, BYK-345, BYK-346, and BYK-348 (all trade names manufactured by BYK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.).

As the fluorine-based surfactants, a fluorine-modified polymer is preferably used and BYK-340 (manufactured by BYK Chemie Japan, Inc.) is mentioned as a specific example.

When adding the surfactant to the ink jet textile printing ink composition, two or more kinds of the surfactants mentioned above are usable. The total content thereof is preferably 0.01% by mass or more and 3% by mass or less, more preferably 0.05% by mass or more and 2% by mass or less, still more preferably 0.1% by mass or more and 1.5% by mass or less, and particularly preferably 0.2% by mass or more and 1% by mass or less based on the total mass of the ink.

Due to the fact that the ink jet textile printing ink composition contains the surfactant, the stability when the ink is discharged from an ink jet head increases. Moreover, the permeability into a fabric can be controlled by the use of a suitable amount of the surfactant.

pH Adjuster

The ink jet textile printing ink composition of this embodiment can contain a pH adjuster for the purpose of adjusting the pH. Examples of the pH adjuster include, but are not particularly limited to, an appropriate combination of acids, bases, weak acids, and weak bases. As examples of the acids and the bases used for such a combination, sulfuric acid, hydrochloric acid, nitric acid, and the like are mentioned as inorganic acids, lithium hydroxide, sodium hydroxide, potassium hydroxide, potassium dihydrogen phosphate, disodium hydrogen phosphate, potassium carbonate, sodium carbonate, sodium hydrogencarbonate, ammonia, and the like are mentioned as inorganic bases, and triethanolamine, diethanolamine, monoethanolamine, tripropanolamine, triisopropanolamine, diisopropanolamine, trishydroxymethylaminomethane (THAM), and the like are mentioned as organic bases, and Good buffers, such as adipic acid, citric acid, succinic acid, lactic acid, N,N-bis(2-hydroxyethyl)-2-aminoethane sulfonic acid (BES), 4-(2-hydroxyethyl)-1-piperazineethane sulfonic acid (HEPES), morpholinoethane sulfonic acid (MES), carbamoylmethylimino bisacetic acid (ADA), piperazine-1,4-bis(2-ethane sulfonic acid) (PIPES), N-(2-acetamide)-2-aminoethane sulfonic acid (ACES), colamine hydrochloride, N-tris (hydroxymethyl)methyl-2-aminoethane sulfonic acid (TES), acetamide glycine, tricine, glycine amide, and bicin, phosphate buffer solutions, citrate buffer solutions, tris buffer solutions, and the like may be used as organic acids. Among the above, tertiary amines, such as triethanolamine and triisopropanolamine, and carboxyl group containing organic acids, such as adipic acid, citric acid, succinic acid, and lactic acid, are preferably contained as a part or the whole of the pH adjuster because a pH buffering effect can be more stably obtained.

In this embodiment, when the pH adjuster is used for the ink jet textile printing ink composition, the pH adjuster is added as appropriate while confirming the pH. For example, the mass of the pH adjuster is preferably 0.01% by mass or more and 3% by mass or less, more preferably 0.1% by mass or more and 2% by mass or less, and still more preferably 0.2% by mass or more and 1% by mass or less in total based on the total mass of the ink jet textile printing ink.

Ureas

Moreover, ureas may be added as a humectant of the ink jet textile printing ink composition or a dyeing assistant improving the dyeing property of the dye. Specific examples of the ureas include urea, ethyleneurea, tetramethylurea, thiourea, 1,3-dimethyl-2-imidazolidinone, and the like. When the urea is added, the content thereof can be set to 1% by mass or more and 10% by mass or less based on the total mass of the ink.

Saccharides

An appropriate amount of saccharides may be used for the purpose of suppressing the solidification and the drying of the ink jet textile printing ink composition. Specific examples of the saccharides include glucose, mannose, fructose, ribose, xylose, arabinose, galactose, aldonic acid, glucitol (sorbitol), maltose, cellobiose, lactose, sucrose, trehalose, maltose, and the like. The saccharides act as a humectant which is not the organic solvent. The content, when used, can be set to 1% by mass or more and 10% by mass or less based on the total mass of the ink.

Chelating Agent

An appropriate amount of a chelating agent may be added for the purpose of removing unnecessary ions in the ink jet textile printing ink composition. Examples of the chelating agent include ethylenediaminetetraacetic acids or salts thereof, such as disodium dihydrogen ethylenediaminetetraacetate or nitrilotriacetate, hexametaphosphate, pyrophosphate, or metaphosphate of ethylene diamine, for example. When the chelating agent is added, the content thereof can be set to 0.01% by mass or more and 1% by mass or less based on the total mass of the ink.

Antiseptic, Antifungal Agent

For the ink jet textile printing ink composition, an antiseptic and an antifungal agent may be used as appropriate. Examples of the antiseptic and the antifungal agent include sodium benzoate, sodium pentachlorophenol, sodium 2-pyridinethiol-1-oxide, sodium sorbate, sodium dehydroacetate, 1,2-dibenzoisothiazoline-3-one, (for example, Proxel CRL, Proxel BDN, Proxel GXL, Proxel XL.2, Proxel TN, and Proxel LV of Lonza), 4-chloro-3-methyl phenol (Preventol CMK of Beyer and the like) and the like, for example.

Others

Furthermore, as components other than the components mentioned above, additives which can be usually used in an ink jet ink, such as an antirust, e.g., benzotriazole, an antioxidant, an ultraviolet absorber, an oxygen absorbent, and a dissolution assistant, for example, may be contained.

2.5. Method for Preparing Ink Jet Textile Printing Ink Composition

The ink jet textile printing ink according to this embodiment is obtained by mixing the components mentioned above in an arbitrary order, and then performing filtration or the like, as necessary, to remove impurities. As a method for mixing the components, a method including successively adding materials into a container provided with a stirring device, such as a mechanical stirrer or a magnetic stirrer, and then stirring and mixing the components is preferably used. As a filtration method, centrifugal filtration, filter filtration, and the like can be performed as necessary.

2.6. Physical Properties of Ink Jet Textile Printing Ink Composition pH

In this embodiment, the ink jet textile printing ink composition has a pH of preferably 6.0 or more and 10.0 or less, more preferably 6.0 or more and 9.5 or less, and still more preferably 7.0 or more and 9.0 or less. When the pH of the ink jet textile printing ink composition is within this range, the storage stability of the dye in the ink improves and the color developability and the hue of an image to be obtained is hard to change, and therefore a predetermined color of a design can be satisfactorily reproduced. Moreover, the permeability of the ink can be controlled and the fluorescence intensity reduction can be suppressed by being used as a set with a penetrant described later. Moreover, the permeation into the rear surface is promoted by the penetrant, and therefore the fluorescence intensity in the rear surface can also be increased and the fluorescence intensity difference between the front and rear surfaces can be made small.

Surface Tension

In this embodiment, the surface tension at 20° C. of the ink jet textile printing ink composition is preferably 20 mN/m or more and 40 mN/m or less and more preferably 22 mN/m or more and 35 mN/m or less from the viewpoint of the balance between the textile printing quality and the reliability as an ink jet ink. Due to the fact that the surface tension is within the range mentioned above, the discharge stability is excellent in ink jet textile printing and the ink easily uniformly wets and spreads in attachment to a fabric and easily permeates thereinto. Thus, the ink is easily fixed to the fabric.

For the measurement of the surface tension, the measurement can be performed by, for example, confirming the surface tension when a platinum plate is wetted with an ink in a 20° C. environment using an automatic surface tentionmeter CBVP-Z (Trade Name, manufactured by manufactured by Kyowa Interface Science Co., LTD.). As one technique for setting the surface tension within the range mentioned above, a technique of adjusting the type of the organic solvent or the surfactant described above, the addition amount of the organic solvent, the surfactant, and water, and the like as appropriate is mentioned.

Viscosity

The viscosity at 20° C. of the ink is preferably 1.5 mPa·s or more and 10 mPa·s or less, more preferably 2 mPa·s or more and 8 mPa·s or less, still more preferably 4 mPa·s or more and 5.5 mPa·s or less, and most preferably 4.5 mPa·s or more and 5.0 mPa·s or less. When the viscosity at 20° C. of the ink is within the range mentioned above, the ink is more easily fixed when the ink is attached to a fabric.

The measurement of the viscosity can be measured using a viscoelasticity testing machine MCR-series (Trade Name, manufactured by Anton Paar Japan K.K.), for example. As one technique for setting the viscosity within the range mentioned above, a technique of adjusting the type of the organic solvent or the surfactant described above, the addition amount of the organic solvent, the surfactant, and water, and the like as appropriate is mentioned.

Metal Ion Concentration

In this embodiment, the ink jet textile printing ink composition contains one or more selected from an Na ion, a K ion, and an Li ion and the total content of the Na ions, the K ions, and the Li ions is preferably 100 ppm or more, more preferably 200 ppm or more, and still more preferably 500 ppm or more. The total content of the Na ions, the K ions, and the Li ion is preferably 8000 ppm or less, more preferably 7000 ppm or less, and still more preferably 5000 ppm or less. When the total content of the Na ions, the K ions, and the Li ions of the ink jet textile printing ink composition is within the range mentioned above, the blurring of the ink can be suppressed and the fluorescence intensity can also be maintained while maintaining the color development intensity in the surface of a fabric and further the storage stability or the discharge stability of the ink improve. This results in the fact that, due to the fact that the total content of the Na ions, the K ions, and the Li ions is equal to or less than the upper limit mentioned above, the reactivity with a fabric is good, and thus dyeing is satisfactorily performed, and the color development intensity improves while maintaining the fluorescence intensity.

Moreover, particularly when the total content of the Na ions, the K ions, and the Li ions is equal to or more than the lower limit mentioned above, the solubility of the dye can be satisfactorily maintained, the storage stability or the discharge stability can improve, and the occurrence of blurring can be satisfactorily suppressed.

In this embodiment, the ink jet textile printing ink composition contains one or more selected from a Ca ion and an Fe(II) ion. The total content of the Ca ions and the Fe(II) ions is preferably 7 ppm or more, more preferably 30 ppm or more, and still more preferably 50 ppm or more. The total content of the Ca ions and the Fe(II) ions is preferably 200 ppm or less, more preferably 180 ppm or less, and still more preferably 150 ppm or less. When the total content of the Ca ions or the Fe(II) ions of the ink jet textile printing ink composition is within the range mentioned above, the blurring of the ink can be suppressed and also the storage stability or the discharge stability of the ink improve.

3. Penetrant

The penetrant to be used in this embodiment is used for performing printing by being attached to a fabric with the ink jet textile printing ink composition by an ink jet method and contains a compound having a lactam structure and water. In this embodiment, by performing recording with the set of the ink jet textile printing ink composition and the penetrant, the permeation of the ink into the fabric can be appropriately controlled, the concentration quenching can be suppressed, and the fluorescence intensity reduction can be suppressed. Moreover, the permeation of the ink into the rear surface is promoted, and therefore the fluorescence intensity in the rear surface can also be increased and the fluorescence intensity difference between the front and rear surfaces can be made small.

Hereinafter, the penetrant to be used in this embodiment is described.

3.1. Compound Having Lactam Structure

The penetrant to be used in this embodiment contains a compound having a lactam structure. In this embodiment, the compound having the lactam structure has an action of suppressing the bleeding of the ink to a fabric and permeating the ink into the rear surface of a fabric. Therefore, due to the fact that the penetrant contains the compound having the lactam structure and is used for recording with the ink, the permeation into the rear surface of the ink is promoted, and therefore the fluorescence intensity in the rear surface can also be increased. Moreover, the fluorescence intensity difference between the front and rear surfaces can be made small.

When the ink contains the compound having the lactam structure, the fluorescent dye is easily diffused, the blurring occurs by bleeding, or the ink excessively permeates into the rear surface of a fabric, and therefore the fluorescence intensity difference between the front and rear surfaces becomes large in some cases. Furthermore, the storageability of the ink decreases in some cases. Therefore, in order to control the permeability of the ink in a suitable range, suppress the fluorescence intensity reduction in the surface, and reduce the fluorescence intensity difference between the front and rear surfaces, the compound is preferably compounded in the penetrant instead of the ink.

Examples of the compound having the lactam structure include 2-pyrrolidone, 2-azetidinone, 2-piperidone, ε-caprolactam, 4-ethyl-2-azetidinone, N-methyl-2-pyrrolidone, 3-amino-2-piperidone, and the like, for example. The compounds may be used alone or in combination of two or more kinds thereof. Among the compounds, 2-pyrrolidone or N-methyl-2-pyrrolidone is preferably used. In particular, 2-pyrrolidone is preferable in the point that the permeability is good and good color developability in the rear surface is easily obtained.

The content of the compound having the lactam structure is preferably 5% by mass or more, more preferably 10% by mass or more, and still more preferably 15% by mass or more based on the total mass of the penetrant. The content of the compound having the lactam structure is preferably 50% by mass or less, more preferably 45% by mass or less, and still more preferably 40% by mass or less based on the total mass of the penetrant. Due to the fact that the content of the compound having the lactam structure is within the range mentioned above, the permeability of the ink can be controlled in a suitable range, the fluorescence intensity reduction in the surface can be suppressed, and the fluorescence intensity difference between the front and rear surfaces can be made small. In particular, due to the fact that the content of the compound having the lactam structure is equal to or larger than the lower limit mentioned above, suitable permeability is obtained, and therefore the concentration quenching in the surface is suppressed. Moreover, the ink permeates up to the rear surface, and therefore the color developability in the rear surface also improves.

3.2. Water

The penetrant to be used in this embodiment preferably contains water as a main solvent. The water is a component which evaporates and scatters by drying after the penetrant is attached to a fabric which is a recording medium. As the water, the same one as the water illustrated in the ink described above is usable, and therefore the illustration thereof is omitted. The content of the water contained in the penetrant is preferably set to 40% by mass or more, more preferably 50% by mass or more, and still more preferably 60% by mass or more based on the total mass of the penetrant.

3.3. Organic Solvent

In the penetrant to be used in this embodiment, organic solvents other than the compound having the lactam structure may be added. By adding the organic solvent, the wettability of the penetrant to a recording medium can be improved. As the organic solvent, the same glycol ethers or alkyl polyols as those illustrated in the ink jet textile printing ink composition described above are usable. The content of the organic solvent is not particularly limited and can be set to 1% by mass or more and 20% by mass or less based on the total mass of the penetrant.

3.4. Surfactant

To the penetrant to be used in this embodiment, a surfactant may be added. By adding the surfactant, the surface tension of the penetrant can be reduced and the wettability with a recording medium can be improved. As the surfactant, acetylene glycol-based surfactants, silicone-based surfactants, and fluorine-based surfactants can be preferably used similarly to those illustrated in the ink jet textile printing ink composition described above. With respect to specific examples of the surfactants, the same surfactants as the surfactants illustrated in the ink jet textile printing ink composition described above are usable. The content of the surfactant is not particularly limited and can be set to 0.1% by mass or more and 1.5% by mass or less based on the total mass of the penetrant.

3.5. Other Components

To the penetrant to be used in this embodiment, a pH adjuster, an antiseptic and an antifungal agent, an antirust, a chelating agent, and the like may be added as necessary. As the other components, the same substances as those illustrated in the ink jet textile printing ink composition described above are usable.

3.6. Method for Preparing Penetrant

The penetrant to be used in this embodiment can be produced by dispersing and mixing the components described above by an appropriate method. The above-described components are sufficiently stirred, and then filtration is performed in order to remove coarse particles and foreign substances causing clogging, whereby a target penetrant can be obtained.

3.7. Physical Properties of Penetrant pH

In this embodiment, the penetrant has a pH of preferably 6.0 or more and 10.0 or less, more preferably 6.0 or more and 9.5 or less, and still more preferably or more 7.0 and 9.0 or less. Due to the fact that the pH of the penetrant is within this range, the permeability of the ink to be simultaneously used can be controlled and the fluorescence intensity reduction in the surface of a fabric can be suppressed. Moreover, the permeation into the rear surface is promoted by the penetrant, and therefore the fluorescence intensity in the rear surface can also be improved and the fluorescence intensity difference between the front and rear surfaces can be made small. Moreover, the pH of 7.0 or more and 9.0 or less is preferable also in the point that the decomposition of the dye in the ink can be suitably suppressed and a color development intensity reduction is suppressed. Moreover, the pH of 9.0 or more and 9.5 or less is preferable in the viewpoint that the fluorescence intensity is further improved.

Surface Tension

In this embodiment, when the penetrant is discharged by an ink jet recording head, the surface tension at 20° C. of the penetrant is preferably 20 mN/m or more and 40 mN/m or less and more preferably 22 mN/m or more and 35 mN/m or less. Due to the fact that the surface tension is within the range mentioned above, the discharge stability is excellent and the penetrant easily uniformly wets and spreads and easily permeates into a fabric when attached to the fabric. Thus, the penetrant is easily fixed to the fabric. The measurement of the surface tension is the same as that used in the ink.

Viscosity

The viscosity at 20° C. of the penetrant is preferably 1.5 mPa·s or more and 10 mPa·s or less, more preferably 2 mPa·s or more and 8 mPa·s or less, still more preferably 4 mPa·s or more and 5.5 mPa·s or less, and most preferably 4.5 mPa·s or more and 5.0 mPa·s or less. When the viscosity at 20° C. of the penetrant is within the range mentioned above, the penetrant is easily fixed when attached to a fabric. The measurement of the viscosity is the same as that used in the ink.

Metal Ion Concentration

In this embodiment, it is preferable for the penetrant not to contain one or more selected from an Na ion, a K ion, and a Li ion. The total content of the Na ions, the K ions, and the Li ions is preferably 100 ppm or less, more preferably 50 ppm or less, and still more preferably 10 ppm or less. When the total content of the Na ions, the K ions, and the Li ions of the penetrant is within the range mentioned above, the blurring of the ink can be suppressed.

In this embodiment, it is preferable for the penetrant not to contain one or more selected from a Ca ion and a Fe(II) ion. The total content of the Ca ions and the Fe(II) ions is preferably 100 ppm or less, more preferably 50 ppm or less, and still more preferably 10 ppm or less. When the total content of the Ca ions and the Fe(II) ions of the penetrant is within the range mentioned above, the blurring of the ink can be suppressed.

4. Ink Jet Textile Printing Composition Set

The ink jet textile printing composition set according to this embodiment is configured by the ink jet textile printing ink composition and the penetrant described above. In the textile printing using a dye, the penetrant is used in some cases for the purpose of obtaining the same image on the front and rear surfaces of a fabric. In this embodiment, due to the fact that the penetrant contains the compound having the lactam structure and water as described above, the fluorescent dyes are suppressed from being close to each other and the gathering of the dyes is suppressed. This suppresses a concentration quenching phenomenon that the fluorescence generated from fluorescent dye molecules is absorbed by the other dye molecules, so that the fluorescence intensity decreases and particularly suppresses the fluorescence intensity reduction in the surface of a fabric. Although the concentration quenching phenomenon is remarkable particularly in recording with a high Duty of a high dye concentration, the phenomenon is suppressed by the use of the ink and the penetrant described above in this embodiment.

Moreover, in this embodiment, the penetrant promotes the permeation of the ink in the thickness direction of a fabric, and therefore the fluorescence intensity in the fabric rear surface can also be increased and the fluorescence intensity difference between the front and rear surfaces can be made small.

More specifically, in this embodiment, not the diffusion of the ink in the planar direction of a fabric but the permeation of the ink in the thickness direction of a fabric can be promoted, and therefore the dyes can be suppressed from being close to each other, the color development intensity and the fluorescence intensity are good while suppressing the concentration quenching in the surface of a fabric, and the color development intensity and the fluorescence intensity in the rear surface of a fabric can be improved.

Furthermore, in this embodiment, when recording is performed with a low Duty in order to suppress the concentration quenching, a non-dyed portion, that is, an unprinted space or graininess which appears when a fabric on which an image is recorded is stretched is improved.

Thus, this embodiment can solve each problem, which may arise when recording is performed with a high Duty or a low Duty, without changing the composition of the ink each time.

5. Fabric

The ink jet textile printing method according to this embodiment is performed to a fabric. Raw materials configuring the fabric are not particularly limited and, for example, natural fibers, such as cotton, hemp, wool, and silk, synthetic fibers, such as polypropylene, polyester, acetate, triacetate, polyamide, and polyurethane, and biodegradable fibers, such as polylactic acid, and the like are mentioned, and mixed fibers thereof may be acceptable. The fabric may be one obtained by forming the fibers mentioned above into any form of woven fabric, knitted fabric, nonwoven fabric, and the like. The mass per unit area of the fabric to be used in this embodiment is not also particularly limited and is within the range of 1.0 oz (ounce) or more and 10.0 oz or less, preferably 2.0 oz or more and 9.0 oz or less, more preferably 3.0 oz or more and 8.0 oz or less, and still more preferably 4.0 oz or more and 7.0 oz or less. When the mass per unit area of the fabric is within such a range, good recording can be performed. Furthermore, the pigment textile printing ink jet recording method according to this embodiment can be applied to a plurality of kinds of fabrics different in the mass per unit area and good recording can be performed.

6. Ink Jet Textile Printing Method

The ink jet textile printing method according to this embodiment is a recording method of performing printing using the ink jet textile printing ink composition and the penetrant described above, in which the ink jet textile printing ink composition is attached to a fabric, and then the penetrant is attached onto a region where the ink jet textile printing ink composition is attached.

6.1. Ink Composition Attachment Process

An ink composition attachment process is a process of discharging the ink jet textile printing ink composition according to this embodiment to at least one part of a fabric from an ink jet nozzle to attach the same to the fabric. By this process, an image by the fluorescent dye is formed on the fabric.

In the ink composition attachment process, the attachment amount of the ink jet textile printing ink composition to a fabric is not particularly limited insofar as the ink jet textile printing ink composition is attached so that the attachment amount of the penetrant described later to the attachment amount of the ink composition is 0.3 or more and 2.0 or less in a mass ratio. For example, the ink attachment amount is preferably 10 $g/m^2$ or more, more preferably 20 $g/m^2$ or more, and still more preferably 30 $g/m^2$ or more. The ink attachment amount is preferably 100 $g/m^2$ or less, more preferably 80 $g/m^2$ or less, and still more preferably 60 $g/m^2$ or less. Due to the fact that the attachment amount of the ink composition is within the range mentioned above, the color developability of an image to be recorded improves and images, such as pictures or characters, can be recorded on a fabric with sufficient reproducibility.

6.2. Penetrant Attachment Process

A penetrant attachment process is a process of attaching the penetrant onto a region where the ink jet textile printing ink composition is attached.

When the penetrant is attached to a fabric, the penetrant may be attached so that at least one part of the region where the ink composition is attached overlaps. Specifically, the penetrant is preferably attached so that at least 50% or more of the region where the ink composition is attached overlaps, more preferably attached so that at least 60% or more of the region overlaps, still more preferably attached so that at least 70% or more of the region overlaps, and particularly preferably attached so that at least 80% or more of the region overlaps. Thus, by attaching the penetrant, the ink is permeated up to the rear surface, the concentration quenching phenomenon is further suppressed, and the fluorescence intensity reduction is suppressed. Moreover, the fluorescence intensity in the fabric rear surface can also be increased and the fluorescence intensity difference between the front and rear surfaces can be made small.

In the penetrant attachment process, the attachment amount of the penetrant to a fabric is not particularly limited insofar as the penetrant is attached so that the mass ratio of the attachment amount of the penetrant to the attachment amount of the ink composition described above is 0.3 or more and 2.0 or less. For example, the penetrant attachment amount is preferably 5.0 $g/m^2$ or more, more preferably 10 $g/m^2$ or more, and still more preferably 20 $g/m^2$ or more. The ink attachment amount is preferably 100 $g/m^2$ or less, more preferably 80 $g/m^2$ or less, and still more preferably 60 $g/m^2$ or less. When the attachment amount of the penetrant is within the range mentioned above, the concentration quenching phenomenon is suppressed and the fluorescence intensity reduction is suppressed. Moreover, the ink can be permeated up to the rear surface, so that the fluorescence intensity in the fabric rear surface can also be increased and the fluorescence intensity difference between the front and rear surfaces can be made small.

With respect to the attachment amount of the penetrant to a fabric in the penetrant attachment process, the mass ratio of the attachment amount of the penetrant to the attachment amount of the ink composition described above is preferably 0.3 or more and 2.0 or less, more preferably 0.5 or more and 1.7 or less, and still more preferably 0.8 or more and 1.5 or less. Due to the fact that the mass ratio of the attachment amount of the penetrant to the attachment amount of the ink composition is within the range mentioned above, the ink is permeated up to the rear surface, the concentration quenching phenomenon is suppressed, and the fluorescence intensity reduction is suppressed. Moreover, the fluorescence intensity in the fabric rear surface can also be increased and the fluorescence intensity difference between the front and rear surfaces can be made small. Moreover, in particular, due to the fact that the mass ratio of the attachment amount of the penetrant to the attachment amount of the ink composition is equal to or more than the lower limit, suitable permeability is obtained and good color developability and fluorescence intensity can be obtained also in the rear surface. Moreover, in particular, due to the fact that the mass ratio of the attachment amount of the penetrant to the attachment amount of the ink composition is equal to or less than the upper limit, excessive permeation can be suppressed and a reduction in color developability and fluorescence intensity in the front surface can be suppressed. Moreover, the occurrence of blurring can be suppressed.

Examples of a method for attaching the penetrant to a fabric include, for example, a method for dipping a fabric into the penetrant (dip coating), a method for applying the penetrant with a roll coater or the like (roller coating), a method for ejecting the penetrant with a spray device or the like (spray coating), a method for ejecting the penetrant with an ink jet system (ink jet coating), and the like and any method may be used. Herein, when ink jet textile printing is performed using a printer 1 illustrated in FIGURE, it is preferable to attach the penetrant to a fabric M by the ink jet coating from an ink jet head 2. When the penetrant attachment process is performed by the ink jet coating, the penetrant can be more uniformly attached to the fabric M.

6.3. Fixing Process

The ink jet textile printing method according to this embodiment may also include a fixing process of fixing the fluorescent dye which is attached by the ink composition attachment process to a fabric.

Specifically, the fixing process is a heat treatment process of giving at least either heat or steam to the fabric obtained in the ink composition attachment process. By this process, the fluorescent dye in the ink is dyed to fibers of the fabric. For the heat treatment process, conventionally known methods are usable and a heating mechanism 6 illustrated in FIGURE is mentioned. Examples of such a heating mechanism include a heat press method, a normal pressure steam method, a high pressure steam method, a hot air drying method, and a thermofix method in addition to the mechanism mentioned above.

The temperature in the fixing process, i.e., the reaching temperature of a fabric, is preferably set within the range of 90° C. or more and 110° C. or less from the viewpoint of reducing damages to the fabric.

6.4. Washing Process

The ink jet textile printing method according to this embodiment may also include a washing process of washing printed matter. The washing process is performed after the fixing process and aims at removing a dye which is not dyed to fibers. The washing process can be performed using water or warm water and may be performed two or more times or soaping processing may be performed as necessary, for example.

6.5. Other Processes

The ink jet textile printing method according to this embodiment may include a pretreatment process of giving a pretreatment composition containing at least either an alkali agent or a hydrotropy agent to a fabric as necessary. Examples of a method for giving the pretreatment composition to a fabric, the same methods as the methods for attaching the penetrant described above are mentioned and any method is usable.

Moreover, the ink jet textile printing method according to this embodiment may include a pretreatment composition drying process of drying the pretreatment composition given to the fabric after the pretreatment process described above and before the attachment process described above. Although the drying of the pretreatment composition may be performed by natural drying, drying accompanied by heating is preferable from the viewpoint of an increase in heating speed. When accompanied by heating in the pretreatment composition drying process, the heating method is not particularly limited and, for example, the same methods as those in the fixing process described above are mentioned, for example.

6.6. Operational Effects

According to the ink jet textile printing method of this embodiment, by the use of the ink jet textile printing ink composition and the penetrant described above, the ink is permeated up to the rear surface, the fluorescent dyes are suppressed from being close to each other, and the gathering of the dyes is suppressed. This prevents the concentration quenching phenomenon that the fluorescence generated from fluorescent dye molecules is absorbed by the other dye molecules, so that the fluorescence intensity decreases is suppressed and particularly the fluorescence intensity reduction in the surface of a fabric is suppressed. Although the concentration quenching phenomenon is remarkable particularly in recording with a high Duty of a high dye concentration, the phenomenon is suppressed by performing recording using the ink and the penetrant described above in this embodiment.

Moreover, in this embodiment, the penetrant promotes the permeation of the ink in the fabric thickness direction, and therefore the fluorescence intensity in the fabric rear surface can also be increased and the fluorescence intensity difference between the front and rear surfaces can be made small.

Furthermore, in this embodiment, when recording is performed with a low Duty in order to suppress the concentration quenching, a non-dyed portion, that is, an unprinted space or graininess which appears when a fabric on which an image is recorded is stretched is improved.

7. Examples

Hereinafter, the invention is more specifically described with reference to Examples and Comparative Examples but the invention is not limited only to Examples. In Examples and Comparative Examples, "part(s)" and "%" are expressed on a mass basis unless otherwise particularly specified.

7.1. Preparation of Ink Jet Textile Printing Ink Composition and Penetrant

The components given in Tables 1-1 to 2 were mixed and stirred with a magnetic stirrer for 2 hours, and further filtered using a membrane filter having a pore size of 5 μm to give ink jet textile printing ink compositions A1 to A17 and B1 to B12 and penetrants C1 C8. In Tables 1-1 to 2, unless otherwise specified, the unit of the numerical values is % by mass and ion exchanged water was added so that the total mass of the ink and the penetrant was 100% by mass.

Each ink composition and each penetrant were mixed with an adsorbent (zeolite), stirred, and then filtered. The metal ion content was adjusted by changing the stirring time and the adsorbent amount. The content of Ca ions and Fe ions was measured by ion chromatography and the total amount was given in Tables 1-1 and 1-2. For the ion chromatography, DX-500 Ion chromatograph (Product Name, manufactured by Dionex) was used and IonPac AS11 (4×250 mm, Product Name, manufactured by Dionex) was used as a column. $CaCl_2$) was added with respect to A6, A8, A10, B5, B7, and B9 and $NaCl_2$ was added with respect to A11 and B10, to adjust the ion concentration to a predetermined ion concentration.

The prepared ink compositions and penetrants were measured for the pH using a pH METER MODEL PH82 (Product Name, manufactured by YOKOGAWA ELECTRIC CORP.).

Moreover, the prepared ink compositions and the penetrants were measured for the surface tension using an automatic surface tensiometer CBVP-Z (Product Name, manufactured by Kyowa Interface Science Co., LTD.) when a platinum plate was soaked in the ink in a 25° C. environment.

TABLE 1-1

| | | Ink jet textile printing ink composition | | | | | | | | | |
|---|---|---|---|---|---|---|---|---|---|---|---|
| | | A1 | A2 | A3 | A4 | A5 | A6 | A7 | A8 | A9 | A10 |
| Fluorescent dye | C.I. Acid Yellow 184 | 1.50 | | 1.50 | 4.00 | | 1.50 | 1.50 | 1.50 | 1.50 | 1.50 |
| | C.I. Acid Yellow 250 | | 1.50 | | | | | | | | |
| | C.I. Acid Yellow 73 | | | | | 1.50 | | | | | |
| | C.I. Acid Red 52 | | | | | | | | | | |
| | C.I. Acid Red 289 | | | | | | | | | | |
| | C.I. Acid Red 74 | | | | | | | | | | |
| Organic solvent | 2-pyrolidone | | | 20 | | | | | | | |
| | N-methyl-2-pyrolidone | | | | | | | | | | |
| | Triethylene glycol monobutyl ether | | | 3 | | | | | | | |

TABLE 1-1-continued

|  |  | | | | | | | | | | |
|---|---|---|---|---|---|---|---|---|---|---|---|
|  | Dipropylene glycol | 10 | 10 | 3 | 10 | 10 | 10 | 10 | 10 | 10 | 10 |
|  | 3-methyl-1,5-pentanediol | 8 | 8 |  | 8 | 8 | 8 | 8 | 8 | 8 | 8 |
|  | Propylene glycol | 10 | 10 |  | 8 | 10 | 10 | 10 | 10 | 10 | 10 |
|  | Glycerol |  |  |  |  |  |  |  |  |  |  |
|  | Triethylene glycol |  |  |  |  |  |  |  |  |  |  |
| pH adjuster | Adipic acid | 0.15 | 0.15 | 0.15 | 0.15 | 0.15 | 0.15 | 0.15 | 0.15 | 0.15 | 0.15 |
|  | Triethanolamine | 0.5 | 0.5 | 0.5 | 0.5 | 0.5 | 0.5 | 0.5 | 0.5 | 0.5 | 0.5 |
| Surfactant | Olefin E1010 | 1.0 | 1.0 | 1.0 | 1.0 | 1.0 | 1.0 | 1.0 | 1.0 | 1.0 | 1.0 |
|  | Olefin PD002W |  |  |  |  |  |  |  |  |  |  |
| Others | Proxel XL2 | 0.2 | 0.2 | 0.2 | 0.2 | 0.2 | 0.2 | 0.2 | 0.2 | 0.2 | 0.2 |
|  | Benzotriazole | 0.01 | 0.01 | 0.01 | 0.01 | 0.01 | 0.01 | 0.01 | 0.01 | 0.01 | 0.01 |
|  | EDTA•2Na | 0.01 | 0.01 | 0.01 | 0.01 | 0.01 | 0.01 | 0.01 | 0.01 | 0.01 | 0.01 |
|  | Water | Balance | Balance | Balance | Balance | Balance | Balance | Balance | Balance | Balance | Balance |
|  | Total | 100 | 100 | 100 | 100 | 100 | 100 | 100 | 100 | 100 | 100 |
|  | pH | 7.5 | 7.5 | 7.5 | 7.5 | 7.5 | 7.5 | 7.5 | 7.5 | 7.5 | 7.5 |
|  | Surface tension | 35.0 | 35.0 | 35.0 | 35.0 | 35.0 | 35.0 | 35.0 | 35.0 | 35.0 | 35.0 |
|  | Total content of Na ions, K ions, Li ions (ppm) | 5000 | 5000 | 5000 | 5000 | 5000 | 100 | 8000 | 80 | 8100 | 5000 |
|  | Total content of Ca ions and Fe ions (ppm) | 30 | 30 | 30 | 30 | 30 | 30 | 30 | 30 | 30 | 150 |

|  |  | Ink jet textile printing ink composition | | | | | | |
|---|---|---|---|---|---|---|---|---|
|  |  | A11 | A12 | A13 | A14 | A15 | A16 | A17 |
| Fluorescent dye | C.I. Acid Yellow 184 | 1.50 | 0.50 | 0.80 | 5.00 | 6.00 | 1.90 | 2.30 |
|  | C.I. Acid Yellow 250 |  |  |  |  |  |  |  |
|  | C.I. Acid Yellow 73 |  |  |  |  |  |  |  |
|  | C.I. Acid Red 52 |  |  |  |  |  |  |  |
|  | C.I. Acid Red 289 |  |  |  |  |  |  |  |
|  | C.I. Acid Red 74 |  |  |  |  |  |  |  |
| Organic solvent | 2-pyrolidone |  |  |  |  |  |  |  |
|  | N-methyl-2-pyrolidone |  |  |  |  |  |  |  |
|  | Triethylene glycol monobutyl ether |  |  |  |  |  |  |  |
|  | Dipropylene glycol | 10 | 10 | 10 | 10 | 10 | 10 | 10 |
|  | 3-methyl-1,5-pentanediol | 8 | 8 | 8 | 8 | 8 | 8 | 8 |
|  | Propylene glycol | 10 | 10 | 10 | 10 | 10 | 10 | 10 |
|  | Glycerol |  |  |  |  |  |  |  |
|  | Triethylene glycol |  |  |  |  |  |  |  |
| pH adjuster | Adipic acid | 0.15 | 0.15 | 0.15 | 0.15 | 0.15 | 0.15 | 0.15 |
|  | Triethanolamine | 0.5 | 0.5 | 0.5 | 0.5 | 0.5 | 0.5 | 0.5 |
| Surfactant | Olefin E1010 | 1.0 | 1.0 | 1.0 | 1.0 | 1.0 | 1.0 | 1.0 |
|  | Olefin PD002W |  |  |  |  |  |  |  |
| Others | Proxel XL2 | 0.2 | 0.2 | 0.2 | 0.2 | 0.2 | 0.2 | 0.2 |
|  | Benzotriazole | 0.01 | 0.01 | 0.01 | 0.01 | 0.01 | 0.01 | 0.01 |
|  | EDTA•2Na | 0.01 | 0.01 | 0.01 | 0.01 | 0.01 | 0.01 | 0.01 |
|  | Water | Balance | Balance | Balance | Balance | Balance | Balance | Balance |
|  | Total | 100 | 100 | 100 | 100 | 100 | 100 | 100 |
|  | pH | 7.5 | 7.5 | 7.5 | 7.5 | 7.5 | 7.5 | 7.5 |
|  | Surface tension | 35.0 | 35.0 | 35.0 | 35.0 | 35.0 | 35.0 | 35.0 |
|  | Total content of Na ions, K ions, Li ions (ppm) | 5000 | 5000 | 5000 | 5000 | 5000 | 5000 | 5000 |
|  | Total content of Ca ions and Fe ions (ppm) | 7 | 30 | 30 | 30 | 30 | 30 | 30 |

TABLE 1-2

|  |  | Ink jet textile printing ink composition | | | | | | | | | | | |
|---|---|---|---|---|---|---|---|---|---|---|---|---|---|
|  |  | B1 | B2 | B3 | B4 | B5 | B6 | B7 | B8 | B9 | B10 | B11 | B12 |
| Fluorescent dye | C.I. Acid Yellow 184 |  |  |  |  |  |  |  |  |  |  |  |  |
|  | C.I. Acid Yellow 250 |  |  |  |  |  |  |  |  |  |  |  |  |
|  | C.I. Acid Yellow 73 |  |  |  |  |  |  |  |  |  |  |  |  |

TABLE 1-2-continued

|  |  | Ink jet textile printing ink composition |  |  |  |  |  |  |  |  |  |  |  |
|---|---|---|---|---|---|---|---|---|---|---|---|---|---|
|  |  | B1 | B2 | B3 | B4 | B5 | B6 | B7 | B8 | B9 | B10 | B11 | B12 |
|  | C.I. Acid Red 52 | 3.00 |  | 4.50 |  | 3.00 | 3.00 | 3.00 | 3.00 | 3.00 | 3.00 | 2.30 | 1.90 |
|  | C.I. Acid Red 289 |  | 3.00 |  |  |  |  |  |  |  |  |  |  |
|  | C.I. Acid Red 74 |  |  |  | 3.00 |  |  |  |  |  |  |  |  |
| Organic solvent | 2-pyrolidone |  |  |  |  |  |  |  |  |  |  |  |  |
|  | N-methyl-2-pyrolidone |  |  |  |  |  |  |  |  |  |  |  |  |
|  | Triethylene glycol monobutyl ether |  |  |  |  |  |  |  |  |  |  |  |  |
|  | Dipropylene glycol | 9 | 9 | 9 | 9 | 9 | 9 | 9 | 9 | 9 | 9 | 9 | 9 |
|  | 3-methyl-1,5-pentanediol | 7 | 7 | 7 | 7 | 7 | 7 | 7 | 7 | 7 | 7 | 7 | 7 |
|  | Propylene glycol | 8 | 8 | 8 | 8 | 8 | 8 | 8 | 8 | 8 | 8 | 8 | 8 |
|  | Glycerol |  |  |  |  |  |  |  |  |  |  |  |  |
|  | Triethylene glycol |  |  |  |  |  |  |  |  |  |  |  |  |
| pH adjuster | Adipic acid |  |  |  |  |  |  |  |  |  |  |  |  |
|  | Triethanolamine | 0.5 | 0.5 | 0.5 | 0.5 | 0.5 | 0.5 | 0.5 | 0.5 | 0.5 | 0.5 | 0.5 | 0.5 |
| Surfactant | Olefin E1010 | 1.0 | 1.0 | 1.0 | 1.0 | 1.0 | 1.0 | 1.0 | 1.0 | 1.0 | 1.0 | 1.0 | 1.0 |
|  | Olefin PD002W |  |  |  |  |  |  |  |  |  |  |  |  |
| Others | Proxel XL2 | 0.2 | 0.2 | 0.2 | 0.2 | 0.2 | 0.2 | 0.2 | 0.2 | 0.2 | 0.2 | 0.2 | 0.2 |
|  | Benzotriazole | 0.01 | 0.01 | 0.01 | 0.01 | 0.01 | 0.01 | 0.01 | 0.01 | 0.01 | 0.01 | 0.01 | 0.01 |
|  | EDTA•2Na | 0.01 | 0.01 | 0.01 | 0.01 | 0.01 | 0.01 | 0.01 | 0.01 | 0.01 | 0.01 | 0.01 | 0.01 |
|  | Water | Balance | Balance | Balance | Balance | Balance | Balance | Balance | Balance | Balance | Balance | Balance | Balance |
|  | Total | 100 | 100 | 100 | 100 | 100 | 100 | 100 | 100 | 100 | 100 | 100 | 100 |
|  | pH | 9.0 | 9.0 | 9.0 | 9.0 | 9.0 | 9.0 | 9.0 | 9.0 | 9.0 | 9.0 | 9.0 | 9.0 |
|  | Surface tension | 35.0 | 35.0 | 35.0 | 35.0 | 35.0 | 35.0 | 35.0 | 35.0 | 35.0 | 35.0 | 35.0 | 35.0 |
|  | Total content of Na ions, K ions, Li ions (ppm) | 5000 | 5000 | 5000 | 5000 | 100 | 8000 | 80 | 8100 | 5000 | 5000 | 5000 | 5000 |
|  | Total content of Ca ions and Fe ions (ppm) | 30 | 30 | 30 | 30 | 30 | 30 | 30 | 30 | 150 | 7 | 30 | 30 |

TABLE 2

|  |  | Penetrant |  |  |  |  |  |  |  |
|---|---|---|---|---|---|---|---|---|---|
|  |  | C1 | C2 | C3 | C4 | C5 | C6 | C7 | C8 |
| Organic solvent | 2-pyrolidone | 40 | 20 | 40 | 15 |  | 3 | 5 |  |
|  | N-methyl-2-pyrolidone |  | 20 |  |  | 40 |  |  |  |
|  | Triethylene glycol monobutyl ether | 2 | 2 | 2 | 2 | 2 | 2 | 2 | 2 |
|  | Dipropylene glycol |  |  |  |  |  |  |  |  |
|  | 3-methyl-1,5-pentanediol |  |  |  |  |  |  |  |  |
|  | Propylene glycol | 5 | 5 | 5 | 30 | 5 | 30 | 30 | 5 |
|  | Glycerol |  |  |  |  |  |  |  | 30 |
|  | Triethylene glycol |  |  |  |  |  |  |  | 10 |
| pH adjuster | Adipic acid | 0.2 | 0.2 |  | 0.2 | 0.2 | 0.2 | 0.2 | 0.2 |
|  | Triethanolamine | 0.5 | 0.5 | 0.5 | 0.5 | 0.5 | 0.5 | 0.5 | 0.5 |
| Surfactant | Olefin E1010 |  |  |  |  |  |  |  |  |
|  | Olefin PD002W | 0.5 | 0.5 | 0.5 | 0.5 | 0.5 | 0.5 | 0.5 | 0.5 |
| Others | Proxel XL2 | 0.2 | 0.2 | 0.2 | 0.2 | 0.2 | 0.2 | 0.2 | 0.2 |
|  | Benzotriazole | 0.01 | 0.01 | 0.01 | 0.01 | 0.01 | 0.01 | 0.01 | 0.01 |
|  | EDTA•2Na | 0.01 | 0.01 | 0.01 | 0.01 | 0.01 | 0.01 | 0.01 | 0.01 |
|  | Water | Balance | Balance | Balance | Balance | Balance | Balance | Balance | Balance |
|  | Total | 100 | 100 | 100 | 100 | 100 | 100 | 100 | 100 |
|  | pH | 7.5 | 7.5 | 9.5 | 7.5 | 7.5 | 7.5 | 7.5 | 7.5 |
|  | Surface tension | 32.0 | 32.0 | 32.0 | 32.0 | 32.0 | 32.0 | 32.0 | 32.0 |
|  | Total content of Na ions, K ions, Li ions (ppm) | 5 | 5 | 5 | 5 | 5 | 5 | 5 | 5 |
|  | Total content of Ca ions and Fe ions (ppm) | 5 | 5 | 5 | 5 | 5 | 5 | 5 | 5 |

Among the components given in Tables 1-1 to 2, the details of the components not indicated by Compound Name are as follows.

Olefin E1010: Acetylene glycol-based surfactant, manufactured by Nisshin Chemical Co., Ltd.

Olefin PD002W: Acetylene glycol-based surfactant, manufactured by Nisshin Chemical Co., Ltd.

Proxel XL2: Antiseptic, manufactured by Lonza

EDTA.2Na: Disodium ethylenediaminetetraacetate 7.2. Production of Printed Textile Each ink composition and each penetrant were attached to a nylon fabric in the combination given in Table 2 by an ink jet method using an ink jet printer (Product Name "PX-G930", manufactured by Seiko Epson Corp.). As the recording conditions, the recording resolution was set to 1440 dpi×720 dpi, the ink mass was set to 23 ng/dot, the recording range was set to the A4 size, and the attachment amounts of each ink composition and each penetrant became values given in Table 2. The ink composition was attached, and then the penetrant was attached to a region where the ink composition was attached while being overlapped to produce a printed textile in which the ink was printed on the fabric which was a recording medium.

TABLE 3

| | | Ex. | | | | | | | | | |
|---|---|---|---|---|---|---|---|---|---|---|---|
| | No. | 1 | 2 | 3 | 4 | 5 | 6 | 7 | 8 | 9 | 10 |
| | Ink jet textile printing ink composition | A1 | A2 | A3 | A4 | A5 | A6 | A7 | A8 | A9 | A10 |
| | Penetrant | C1 | C1 | C1 | C1 | C1 | C1 | C1 | C1 | C1 | C1 |
| Coating amount [g/m$^2$] | Ink jet textile printing ink composition | 40.0 | 40.0 | 40.0 | 40.0 | 40.0 | 40.0 | 40.0 | 40.0 | 40.0 | 40.0 |
| | Penetrant | 40.0 | 40.0 | 40.0 | 40.0 | 40.0 | 40.0 | 40.0 | 40.0 | 40.0 | 40.0 |
| Coating ratio | Penetrant/Ink composition | 1.0 | 1.0 | 1.0 | 1.0 | 1.0 | 1.0 | 1.0 | 1.0 | 1.0 | 1.0 |
| Fabric front surface | Color development intensity | A | A | B | AA | A | A | B | A | C | A |
| | Fluorescence intensity | AA | A | S | A | A | AA | AA | AA | AA | AA |
| | Blurring | A | A | B | A | A | B | A | C | A | AA |
| Fabric rear surface | Color development intensity | B | B | A | A | B | B | B | B | B | B |
| | Fluorescence intensity | S | AA | AA | AA | A | S | S | S | S | S |

| | | Ex. | | | | | | |
|---|---|---|---|---|---|---|---|---|
| | No. | 11 | 12 | 13 | 14 | 15 | 16 | 17 |
| | Ink jet textile printing ink composition | A11 | A12 | A13 | A14 | A15 | A16 | A17 |
| | Penetrant | C1 | C1 | C1 | C1 | C1 | C1 | C1 |
| Coating amount [g/m$^2$] | Ink jet textile printing ink composition | 40.0 | 40.0 | 40.0 | 40.0 | 40.0 | 40.0 | 40.0 |
| | Penetrant | 40.0 | 40.0 | 40.0 | 40.0 | 40.0 | 40.0 | 40.0 |
| Coating ratio | Penetrant/Ink composition | 1.0 | 1.0 | 1.0 | 1.0 | 1.0 | 1.0 | 1.0 |
| Fabric front surface | Color development intensity | A | B | B | AA | AA | A | AA |
| | Fluorescence intensity | AA | S | S | A | A | AA | A |
| | Blurring | B | A | A | A | A | A | A |
| Fabric rear surface | Color development intensity | B | C | B | A | A | B | A |
| | Fluorescence intensity | S | AA | S | AA | A | S | AA |

| | | Ex. | | | | | | | | | |
|---|---|---|---|---|---|---|---|---|---|---|---|
| | No. | 18 | 19 | 20 | 21 | 22 | 23 | 24 | 25 | 26 | 27 |
| | Ink jet textile printing ink composition | A1 | A1 | A1 | A1 | A1 | A1 | A1 | A1 | A1 | A1 |
| | Penetrant | C1 | C1 | C1 | C1 | C2 | C3 | C4 | C5 | C6 | C7 |
| Coating amount [g/m$^2$] | Ink jet textile printing ink composition | 40.0 | 40.0 | 40.0 | 40.0 | 40.0 | 40.0 | 40.0 | 40.0 | 40.0 | 40.0 |
| | Penetrant | 80.0 | 90.0 | 10.0 | 9.0 | 40.0 | 40.0 | 40.0 | 40.0 | 40.0 | 40.0 |
| Coating ratio | Penetrant/Ink composition | 2.0 | 2.3 | 0.3 | 0.2 | 1.0 | 1.0 | 1.0 | 1.0 | 1.0 | 1.0 |
| Fabric front surface | Color development intensity | B | B | AA | AA | AA | B | AA | AA | AA | AA |
| | Fluorescence intensity | S | S | A | A | A | S | A | A | B | B |
| | Blurring | A | B | A | A | A | A | A | A | A | A |
| Fabric rear surface | Color development intensity | A | A | C | C | C | C | C | C | C | C |
| | Fluorescence intensity | AA | AA | S | AA | S | S | S | S | A | AA |

| | | Ex. | | | | | | | |
|---|---|---|---|---|---|---|---|---|---|
| | No. | 28 | 29 | 30 | 31 | 32 | 33 | 34 | 35 |
| | Ink jet textile printing ink composition | B1 | B2 | B3 | B4 | B5 | B6 | B7 | B8 |
| | Penetrant | C1 | C1 | C1 | C1 | C1 | C1 | C1 | C1 |
| Coating amount | Ink jet textile printing ink composition | 40.0 | 40.0 | 40.0 | 40.0 | 40.0 | 40.0 | 40.0 | 40.0 |

TABLE 3-continued

| [g/m²] | Penetrant | 40.0 | 40.0 | 40.0 | 40.0 | 40.0 | 40.0 | 40.0 | 40.0 |
|---|---|---|---|---|---|---|---|---|---|
| Coating ratio | Penetrant/Ink composition | 1.0 | 1.0 | 1.0 | 1.0 | 1.0 | 1.0 | 1.0 | 1.0 |
| Fabric front surface | Color development intensity | A | A | AA | A | A | B | A | C |
| | Fluorescence intensity | AA | A | A | A | AA | AA | AA | AA |
| | Blurring | A | A | A | A | B | A | C | A |
| Fabric rear surface | Color development intensity | B | B | A | B | B | B | B | B |
| | Fluorescence intensity | S | AA | AA | A | S | S | S | S |

| | | | Ex. | | | | Comp. Ex. | |
|---|---|---|---|---|---|---|---|---|
| | | No. | 36 | 37 | 38 | 39 | 1 | 2 |
| | | Ink jet textile printing ink composition | B9 | B10 | B11 | B12 | A1 | A1 |
| | | Penetrant | C1 | C1 | C1 | C1 | C8 | — |
| Coating amount [g/m²] | | Ink jet textile printing ink composition | 40.0 | 40.0 | 40.0 | 40.0 | 40.0 | 40.0 |
| | | Penetrant | 40.0 | 40.0 | 40.0 | 40.0 | 40.0 | — |
| Coating ratio | | Penetrant/Ink composition | 1.0 | 1.0 | 1.0 | 1.0 | 1.0 | 0.0 |
| Fabric front surface | | Color development intensity | A | A | A | B | AA | A |
| | | Fluorescence intensity | AA | AA | AA | S | C | A |
| | | Blurring | AA | B | A | A | A | A |
| Fabric rear surface | | Color development intensity | B | B | B | C | D | E |
| | | Fluorescence intensity | S | S | S | AA | D | E |

7.3. Evaluation Test

Next, evaluation samples given in Table 2 according to Examples and Comparative Examples used for the following evaluation tests were created as follows.

7.3.1. Evaluation of Color Development Intensity

The printed textile obtained in "7.2. Production of printed textile" was then heat-treated at 100° C. with a steamer (manufactured by Mathis; Steamer DHe type) for 30 minutes, the OD value of each of the front and rear surfaces of the printed textile to which the ink composition was fixed was determined, and then the color developability was evaluated based on the following evaluation criteria. For the measurement of the OD value, a spectrodensitometer ("FD-7", manufactured by Konica Minolta Co., Ltd.) was used.

Evaluation Criteria
AA: 1.5 or more
A: 1.2 or more and less than 1.5
B: 0.9 or more and less than 1.2
C: 0.6 or more and less than 0.9
D: Less than 0.6
E: Evaluation is impossible.

7.3.2. Evaluation of Fluorescence Intensity

The printed textile obtained in "7.2. Production of printed textile" was then heat-treated at 100° C. with a steamer (manufactured by Mathis; Steamer DHe type) for 30 minutes, each of the front and rear surfaces of the printed textile to which the ink composition was fixed was determined for the fluorescent brightening intensity at hue angles of 90 to 120°, and then the fluorescence was evaluated based on the following evaluation criteria. For the measurement of the fluorescent brightening intensity, the spectrodensitometer ("FD-7", manufactured by Konica Minolta Co., Ltd.) was used. When the fluorescence intensities of the front and rear surfaces are all evaluated to be "B" or more, it can be said that the effects of the invention of this application are exhibited.

Evaluation Criteria
S: 5.0 or more
AA: 1.0 or more and less than 5.0
A: 0.5 or more and less than 1.0
B: 0.3 or more and less than 0.5
C: 0.1 or more and less than 0.3
D: Less than 0.1
E: Evaluation is impossible

7.3.3. Evaluation of Blurring

The blurring of an end portion of an image formed on the front surface of the printed textile obtained in "7.2. Production of printed textile" above was visually confirmed, and then the blurring was evaluated based on the following evaluation criteria.

Evaluation Criteria
AA: The maximum width of a blurring portion is 100 μm or less.
A: The maximum width of a blurring portion is more than 100 μm and 150 μm or less.
B: The maximum width of a blurring portion is more than 150 μm and 450 μm or less.
C: The maximum width of a blurring portion is more than 450 μm.

7.4. Evaluation Results

In Comparative Example 1, the penetrant did not contain the compound having the lactam structure, and therefore the ink did not permeate up to the rear surface and the color development intensity in the surface was high but the fluorescence intensity was evaluated to be C due to the concentration quenching and the color development intensity and the fluorescence intensity in the rear surface were evaluated to be D. In Comparative Example 2, no penetrant was used, and therefore a rear surface image was not obtained.

On the other hand, in Examples, the fluorescence intensities in the front and rear surfaces were all evaluated to be "B" or more and the fluorescence intensity difference was small. In the examples of the fluorescent yellow inks of Examples 1 to 11, the color development intensities and the fluorescence intensities in the front and rear surfaces were high by the use of the penetrant. In Example 3, due to the fact that the ink contains pyrrolidone, the ink excessively permeated up to the rear surface as compared with Example 1, and therefore the dye was diffused and the fluorescence intensity in the front surface was high but the fluorescence intensity somewhat decreased due to the concentration quenching. In Example 4, the dye concentration was high, and therefore the color development intensity in the front surface was high but the fluorescence intensity somewhat decreased.

In Example 8, the total content of the Na ions, the K ions, and the Li ions was low, and therefore the blurring occurred. In Example 9, the total content of the Na ions, the K ions, and the Li ions was high, and therefore the color development intensity decreased on the surface. In Example 10, the total content of the Ca ions and the Fe(II) ions was high, and therefore the occurrence of blurring was most suppressed. In Example 11, the total content of the Ca ions and the Fe(II) ions was low, and therefore the blurring occurred as compared with Example 10.

From Example 1 and Examples 12 to 17, when the content of the dye was 0.8 to 1.9% by mass, the surface fluorescence intensities were evaluated to be AA or more and the rear surface fluorescence intensities were evaluated to be S. When the content of the dye was 2.0% by mass or more, the evaluation of the surface fluorescence intensity was somewhat lowered to A and the evaluation of the rear surface fluorescence intensity was somewhat lowered to AA or less due to the influence of concentration quenching.

From Examples 1 and 18 to 21, when the attachment amount of the penetrant to the attachment amount of the ink jet textile printing ink composition is lower, the ink did not permeate up to the rear surface, and therefore the color development intensity in the rear surface decreased and, when the attachment amount was larger, the ink permeated up to the rear surface, and therefore the fluorescence intensity difference in the front and rear surfaces was small. When the mass ratio of the attachment amount of the penetrant to the attachment amount of the ink composition was 2.3, the blurring occurred.

From Examples 1 and 22 to 27, due to a difference in the compound having the lactam structure in the penetrant, the content, and the pH, a difference occurred in the permeability into the rear surface of the ink.

Among the examples of the fluorescent pink inks of Examples 28 to 39, the same tendency as that of the fluorescent yellow inks of Examples 1 to 17 was observed. Moreover, due to a difference in the content of metal ions, a difference occurred in the fluorescence intensity, blurring, and color development intensity. When the content of the dye was 2.3 to 4.5% by mass, the rear surface fluorescence intensity was evaluated to be AA or more and the rear surface color development intensity was evaluated to be B or more. However, when the content of the dye was 2.0% by mass or less, the evaluation of the rear surface color development intensity decreased to C.

As described above, by the use of the ink jet textile printing ink composition and the penetrant containing the compound having the lactam structure, the concentration quenching phenomenon was suppressed, so that the fluorescence intensity was able to be made high in the front and rear surfaces, and the fluorescence intensity difference in the front and rear surfaces was able to be made small. Moreover, by adjusting the composition of the organic solvent in the ink, the content of the dye and the metal ions, and the composition or the pH of the penetrant, the blurring was able to be suppressed and the color development intensity was able to be made suitable.

The invention is not limited to the embodiments described above and can be variously modified. For example, the invention includes substantially the same configurations (e.g., configurations with the same function(s), method(s), and result(s) or configurations with the same object(s) and effect(s)) as the configurations described in the embodiments. The invention also includes configurations in which non-essential portions of the configurations described in the embodiments are replaced. The invention includes configurations capable of exhibiting the same operational effects as those of the configurations described in the embodiments or configurations capable of achieving the same objects. The invention also includes configurations in which known techniques are added to the configurations described in the embodiments.

The entire disclosure of Japanese Patent Application No. 2018-057900, filed Mar. 26, 2018 is expressly incorporated by reference herein.

What is claimed is:

1. An ink jet textile printing composition set comprising:
an ink jet textile printing ink composition and a penetrant,
wherein the ink jet textile printing ink composition contains a fluorescent dye and water,
a content of the fluorescent dye is 0.8% by mass or more and 5.0% by mass or less based on a total mass of the ink jet textile printing ink composition, and
the penetrant contains a compound having a lactam structure and water.

2. The ink jet textile printing composition set according to claim 1, wherein
a content of the compound having the lactam structure is 5.0% by mass or more based on a total mass of the penetrant.

3. The ink jet textile printing composition set according to claim 1, wherein
the compound having the lactam structure contains 2-pyrrolidone or N-methyl-2-pyrrolidone.

4. The ink jet textile printing composition set according to claim 1, wherein
the fluorescent dye is an acidic dye.

5. The ink jet textile printing composition set according to claim 1, wherein
the fluorescent dye contains one or more selected from C.I. Acid Yellow 184, C.I. Acid Yellow 250, C.I. Acid Yellow 73, C.I. Acid Red 52, C.I. Acid Red 74, and C.I. Acid Red 289.

6. The ink jet textile printing composition set according to claim 1, wherein
the ink jet textile printing ink composition contains one or more selected from an Na ion, a K ion, and an Li ion, and
a total content of the Na ion, the K ion, and the Li ion is 100 ppm or more and 8000 ppm or less.

7. An ink jet textile printing method, which is a recording method that performs printing using the ink jet textile printing ink composition and the penetrant according to claim 1, the method comprising:
attaching the ink jet textile printing ink composition to a fabric, and
attaching the penetrant onto a region where the ink jet textile printing ink composition is attached.

8. An ink jet textile printing method, which is a recording method that performs printing using the ink jet textile printing ink composition and the penetrant according to claim 2, the method comprising:
attaching the ink jet textile printing ink composition to a fabric, and
attaching the penetrant onto a region where the ink jet textile printing ink composition is attached.

9. An ink jet textile printing method, which is a recording method that performs printing using the ink jet textile printing ink composition and the penetrant according to claim 3, the method comprising:
attaching the ink jet textile printing ink composition to a fabric, and attaching the penetrant onto a region where the ink jet textile printing ink composition is attached.

10. An ink jet textile printing method, which is a recording method that performs printing using the ink jet textile printing ink composition and the penetrant according to claim 4, the method comprising:
   attaching the ink jet textile printing ink composition to a fabric, and
   attaching the penetrant onto a region where the ink jet textile printing ink composition is attached.

11. An ink jet textile printing method, which is a recording method that performs printing using the ink jet textile printing ink composition and the penetrant according to claim 5, the method comprising:
   attaching the ink jet textile printing ink composition to a fabric, and
   attaching the penetrant onto a region where the ink jet textile printing ink composition is attached.

12. An ink jet textile printing method, which is a recording method that performs printing using the ink jet textile printing ink composition and the penetrant according to claim 6, the method comprising:
   attaching the ink jet textile printing ink composition to a fabric, and
   attaching the penetrant onto a region where the ink jet textile printing ink composition is attached.

13. The ink jet textile printing method according to claim 7, wherein
   an attachment amount of the penetrant to an attachment amount of the ink jet textile printing ink composition is 0.3 or more and 2.0 or less in a mass ratio.

* * * * *